United States Patent [19]
Sensenig

[11] Patent Number: 5,674,594
[45] Date of Patent: Oct. 7, 1997

[54] PLAIN SURFACE ACOUSTICAL PRODUCT

[75] Inventor: Darryl L. Sensenig, Mountville, Pa.

[73] Assignee: Armstrong World Industries, Inc., Lancaster, Pa.

[21] Appl. No.: 295,096

[22] Filed: Aug. 24, 1994

[51] Int. Cl.$^6$ ........................................ B32B 5/16
[52] U.S. Cl. .................. 428/206; 106/795; 106/816; 106/817; 181/293; 181/294; 428/219; 428/311.1; 428/330; 428/341; 428/342; 524/425
[58] Field of Search ...................... 428/206, 219, 428/311.1, 330, 341, 342, 332; 106/792, 795, 816, 817, 464; 252/62; 181/292, 293, 294; 524/425, 426, 427, 497

[56] References Cited

U.S. PATENT DOCUMENTS

| | | | |
|---|---|---|---|
| 3,578,493 | 5/1971 | Smith | 428/330 |
| 3,894,169 | 7/1975 | Miller | 428/425 |
| 3,994,363 | 11/1976 | Hirao et al. | 181/33 G |
| 4,010,307 | 3/1977 | Canard et al. | 428/327 |
| 4,016,234 | 4/1977 | Warren et al. | 264/129 |
| 4,146,564 | 3/1979 | Garrick et al. | 264/516 |
| 4,152,474 | 5/1979 | Cook et al. | 428/327 |
| 4,900,611 | 2/1990 | Carroll, Jr. | 428/216 |
| 4,963,603 | 10/1990 | Felegi et al. | 524/13 |
| 5,134,179 | 7/1992 | Felegi et al. | 524/13 |
| 5,277,762 | 1/1994 | Felegi et al. | 162/145 |

Primary Examiner—H. Thi Le

[57] ABSTRACT

This invention describes two products both with a plain, fine textured, nonperforated surface visual consisting of a fiberboard substrate with or without a laminated porous nonwoven scrim and then a finished painted surface. The finish painted surface decorates or finishes the board, but most important, must remain acoustically transparent to retain the sound absorption properties of the fiberboard prior to painting. The fiberboard substrate is made to be porous or modified with hole perforations to cause it to be a good sound absorber. If the fiberboard substrate is sufficiently porous without hole perforations, then the sprayable, high solids, porous paint can be directly applied. If hole perforations are used to improve the sound absorption properties of the board substrate, then a porous, nonwoven scrim is attached and painted using the same high solids porous paint. This painted scrim must be sufficiently optically opaque to hide the hole punched board, yet sufficiently open to render it acoustically transparent.

5 Claims, 1 Drawing Sheet

PLAIN SURFACE ACOUSTICAL PRODUCT

BACKGROUND OF THE INVENTION

Field of the Invention

The invention is directed to an improved acoustical fiberboard. Methods for obtaining high noise reduction coefficients (NRC) are well known. Fiberglass is known to be a good sound absorber since it has high porosity. It can be decorated with laminated fabrics or painted scrims requiring only a minimal openness in the surface layer for sound to pass through and be absorbed in the substrate.

To make an acoustically high NRC (= or >65) product using a wood or mineral fiberboard substrate, the board porosity must be high. Finish paint applied directly to the board also must not form a continuous film closing off the board surface. Normally this occurs thus lowering the NRC. A method generally used to increase the NRC is hole punching and surface perforations.

The desired product herein is to have a high NRC with a plain, fine textured, unperforated surface visual. If a sanded and painted fiberboard without surface perforations and scrim is the construction, then the porosity of the paint layer must be equal or greater than the porosity of the board in order to retain the sound absorption properties of the board. The special paint that enables high application rates providing adequate coverage while remaining porous is the subject of this invention. Attaining a high porosity and NRC= or >65 is not easily accomplished with fiberboard without sacrificing other material properties such as strength and hardness.

If hole punching the fiberboard is needed to achieve the NRC= or >65, then a facing layer is necessary in order to make a plain, unperforated surface visual. Porous nonwoven scrims are attached for this purpose. Again a special paint is necessary to cover the scrim to make it optically opaque. Opacity is needed to hide the holes yet it must be acoustically transparent.

SUMMARY OF THE INVENTION

This invention describes a plain, fine textured product consisting of a wood or mineral fiber substrate having a high NRC (= or >65) and a surfacing that does not alter the substrate sound absorption characteristics. The surfacing described herein is intended to render a product having a plain, fine textured surface without holes or surface perforations. This surface layer can be a directly applied paint or an attached painted nonwoven scrim. The critical characteristic of this surfacing is that it is acoustically transparent so that the sound can penetrate through the surface and be absorbed in the substrate.

Paints are generally designed and applied at sufficient rates to form a continuous film. Atomized paint droplets coalesce and normally flow, and wick on the substrate to spread over the surface forming a film. This same type of wicking and spreading occurs when painting porous scrims. Retaining acoustical transparency of the surface can be attained by applying small amounts of paint insufficient to form a film, but these small amounts are not optically opaque. Another method is to use a paint having minimal wicking and spreading characteristics. More paint can then be applied without closing off the surface. If hole perforations are needed to develop the desired NRC, these holes can be hidden by applying a porous nonwoven scrim to the board surface bridging the holes and then painted with an acoustically porous paint.

This invention describes a paint which has restricted flow properties and minimized coalesce when applied, thus retaining discrete paint droplets. This is accomplished with a critically high solids liquid suspension which increases viscosity quickly with minimal water loss. The paint also has to have a greater affinity for itself than for the surface to which it is applied. By adding coarse limestone (ranging from 40 mesh to 150 mesh) to a more conventional fine particle paint, the total filler level can be increased to 82% solids while retaining a low viscosity of 1000–4000 cps. Using these coarse fillers in blends with very fine fillers and binders, causes the liquids and fine fillers to hold to the coarse limestone by surface tension. This prevents wicking of the droplets into the surface of the fiberboard or the scrim.

Since flow and coalescence of the paint droplets is minimal, this high solids coating remains discontinuous allowing heavier application rates while retaining an openness essential for air and sound passage.

DESCRIPTION OF THE INVENTION

Figure 1:
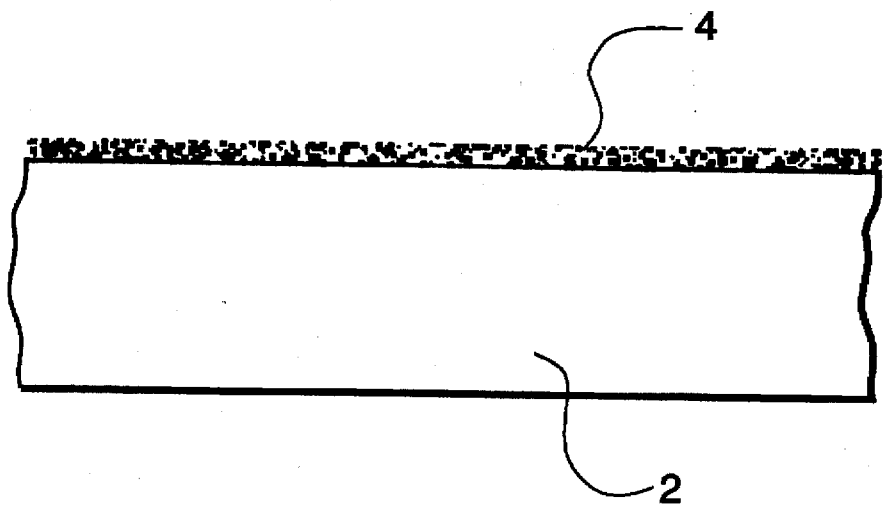
FIG. 1 is a side view of a discontinuous paint coating on a porous fiberboard.

It was determined that paints with a high percent of solids, particularly coarse fillers, permits significantly higher application rates while retaining openness essential for good air and sound passage into a sound absorbing substrate. By blending coarse limestone (ranging from 40 mesh to 150 mesh) with extremely fine (325 mesh and finer) limestone, titanium dioxide, binder and water, unusual properties are secured when this suspension is spray applied. This paint has minimal wicking and spreading characteristics. Minimal coalescence occurs retaining more discrete individual paint droplets. The liquid and fine fillers have a greater affinity for the large particle limestone than for the surface to which they are applied. The factor minimizing coalescence of the paint droplets is the critically high solids, so that with minimal water loss the viscosity quickly increases thus setting the droplet and retaining discrete paint droplets. The use of coarse fillers enables up to 82% filled suspensions with viscosity ranging from 1000–4000 cps, permitting spray application via air atomized guns.

The preferred formulation for the paint is as follows:

| Ingredients | % By Weight | Range % |
|---|---|---|
| Binder-Acrylic latex emulsion 50% solids - B. F. Goodrich | 7.2 | 5–20 |
| Filler-Omyacarb slurry limestone 70% solids - Omya Corp. | 46.4 | 30–50 |
| Filler-40 mesh limestone 100% solids - Pfizer | 40.6 | 30–50 |
| Filler-Titanium dioxide 100% solids | 2.9 | 2–8 |
| Liquid-Water | 2.9 | 2–8 |
| | 100.00 | 100.0 |

When this paint is spray applied, a textured surface is formed. The texture coarseness is controlled by the degree of atomization. Higher atomization air forms a finer texture. There is a limit to the amount of paint that can be applied while still retaining an openness for air and sound passage to the substrate. Higher application rates can be applied to materials which absorb water from the paint droplet more quickly. Rapid absorption minimizes flow and the unwanted formation of a continuous film. Paint application rates as high as 60 gm/sf in one coat can be applied to high water absorption wood or mineral fiberboard and very porous nonwoven scrim, while still retaining openness in the paint layer essential for good air and sound passage.

As the fiberboard or nonwoven scrim becomes less porous, the amount of paint has to be reduced since the water in the paint is not as readily absorbed and flooding occurs closing off the surface. Between 30 to 50 gm/sf of paint is generally ideal for retaining sufficient openness in the surface layer while not affecting the sound absorption properties of the substrate.

To obtain structures of very high NRC (>75), one begins by using a very porous wood or mineral fiber substrate plus holes punched, if needed, at approximately 2000 holes/sf. A nonwoven glass scrim 5 to 20 gm/sf and 0.010" to 0.030" thick is laminated to this substrate using a water based adhesive. The holes are visible through the glass scrim. The high solids paint is spray applied using conventional air atomized spray guns. Up to 50 gm/sf can be applied without a decrease in the NRC. The surfacing is optically opaque and acoustically transparent without visible surface perforations.

Figure 2:
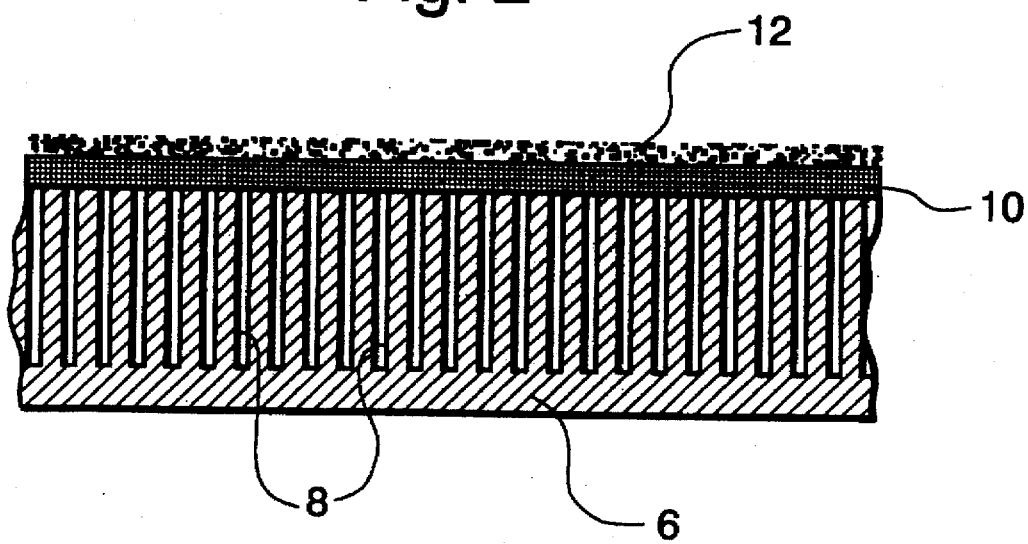
FIG. 2 is a sectional side view of a porous scrim and discontinuous paint coating on a porous perforated fiberboard.

FIG. 1 shows a porous fiberboard substrate 2 with a discontinuous paint coating 4. FIG. 2 shows a hole perforated fiberboard substrate 6 with holes 8. A porous scrim 10 is used with a discontinuous paint coating 12.

What is claimed is:

1. A paint coated fiberboard with a NRC (noise reduction coefficients) rating equal to or greater than 65 comprising:
   (a) a fiberboard base substrate having a visual surface with a NRC rating equal to or greater than 65;
   (b) a paint coating applied to said substrate visual surface, said paint coating being an opaque, open and discontinuous coating means that is acoustically transparent to sound so that the sound can penetrate through the coating means and be absorbed in the substrate; and
   (c) said paint coating consisting essentially of:
      (1) a latex emulsion,
      (2) large size inert limestone filler particles ranging from about 40 mesh to 150 mesh,
      (3) small size inert filler particles ranging from about 325 mesh and finer, and
      (4) water.

2. A paint coated fiberboard as set forth in claim 1 wherein the discontinuous coating has the water and small size particles having a greater affinity for the large size particles than the substrate visual surface to form discrete individual paint droplets as the open and discontinuous coating means.

3. A paint coated fiberboard as set forth in claim 2 wherein the fiberboard base substrate is made of fibers selected from the group consisting of wood, mineral, glass and mixtures thereof.

4. The painted fiberboard of claim 2 wherein:
   (a) a porous scrim is inserted between the paint coating and the visual surface; and
   (b) the visual surface having perforations therein to improve sound absorption thereof.

5. The method of painting a sound absorbing fiberboard comprising the steps of:
   (a) providing a fiberboard with a visual, sound absorbing surface with a NRC (noise reduction coefficients) rating equal to or greater than 65;
   (b) preparing a paint coating with inert limestone particles that cause the formation of discrete, individual paint droplets when the paint coating is applied to the fiberboard surface and has dried on the fiberboard surface; and
   (c) applying said paint coating to said sound absorbing surface to form an open and discontinuous coating that is acoustically transparent to sound and optically opaque so that sound can pass through the coating means and be absorbed in the substrate;
   wherein said paint coating consists essentially of:
      (1) a latex emulsion,
      (2) large size inert limestone filler particles ranging from about 40 mesh to 150 mesh,
      (3) small size inert filler particles ranging from 325 mesh and finer, and
      (4) water.

* * * * *